G. JACOBS.
TRANSMISSION MECHANISM.
APPLICATION FILED OCT. 16, 1908.
1,076,829.
Patented Oct. 28, 1913.
3 SHEETS—SHEET 1.
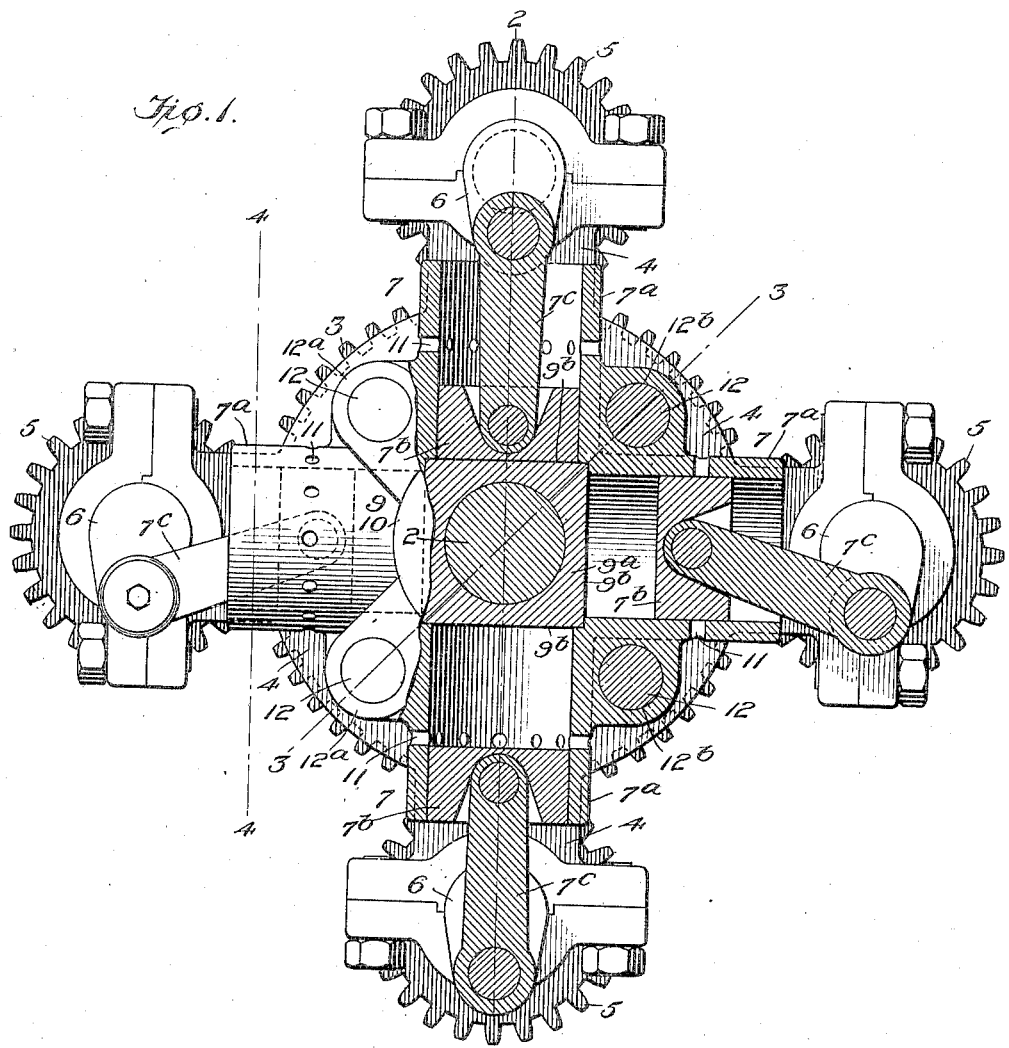

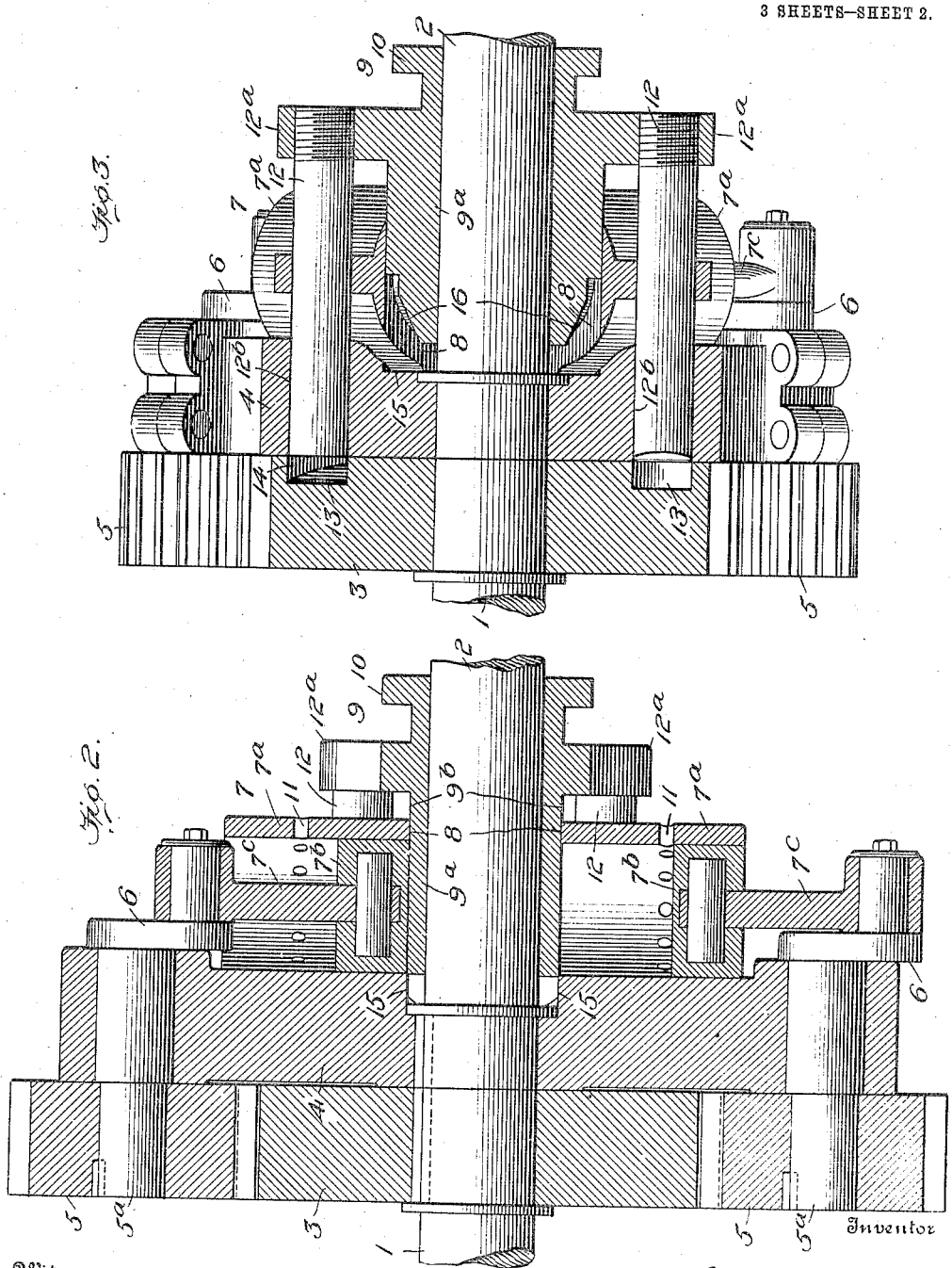

G. JACOBS.
TRANSMISSION MECHANISM.
APPLICATION FILED OCT. 16, 1908.
1,076,829.
Patented Oct. 28, 1913.
3 SHEETS—SHEET 3.
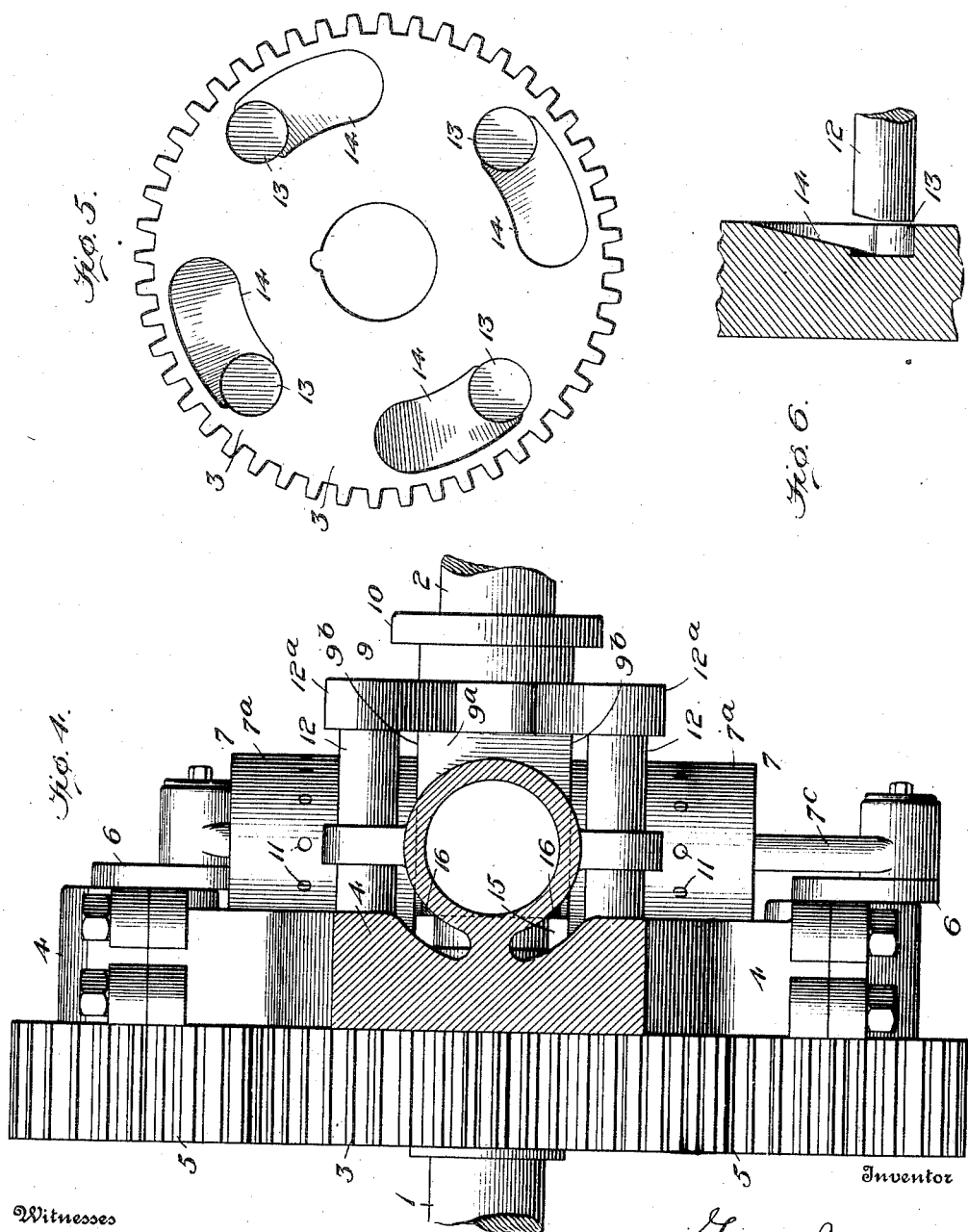

UNITED STATES PATENT OFFICE.

GEORGE JACOBS, OF CANTON, OHIO, ASSIGNOR TO STEWART S. KURTZ, OF CANTON, OHIO.

TRANSMISSION MECHANISM.

1,076,829.  Specification of Letters Patent.  Patented Oct. 28, 1913.

Application filed October 16, 1908. Serial No. 458,101.

*To all whom it may concern:*

Be it known that I, GEORGE JACOBS, a subject of the Emperor of Germany, residing at Canton, in the county of Stark and State of Ohio, have invented certain new and useful Improvements in Transmission Mechanism, of which the following is a specification, reference being had therein to the accompanying drawings.

This invention relates to a power transmission mechanism, and more particularly to variable speed transmission mechanism.

One object of the invention is to provide a variable speed mechanism in which the speed at which power is transmitted is controlled by a fluid.

A further object of the invention is to provide auxiliary or supplemental means to the fluid control system for making the mechanism a positive and direct drive connection at will.

Other objects of my invention will be obvious from the following description of a mechanism embodying it, which has been chosen for the purpose of illustration.

Figure 1 is a view of a transmission mechanism, embodying my invention, the driven shaft being shown in section and parts of the mechanism being broken away. Fig. 2 is a central longitudinal section on the line 2—2, Fig. 1. Fig. 3 is a sectional view on the line 3—3, Fig. 1. Fig. 4 is a sectional view on the line 4—4, Fig. 1. Figs. 5, 6, and 7 are detail views.

In the drawings, 1, 2, indicate two shafts, the former of which is preferably the driving and the latter the driven shaft.

3 indicates a gear fixed to shaft 1, and 4 indicates a disk or plate fixed to shaft 2.

5 are pinions meshing with the gear 3 and each keyed to a shaft $5^a$ which is rotatably mounted in suitable bearings carried by the disk 4. I have shown in the drawings, four of such pinions arranged at equal distances around the said shaft 1, but a less or greater number may be provided as is found desirable.

6 is a crank secured to or made integral with each of the shafts $5^a$.

7 represents fluid mechanism comprising a cylinder $7^a$ and a piston $7^b$, adapted to compress fluid therein.

$7^c$ represents a connecting rod between the piston $7^b$ and the adjacent crank 6. I provide as many cylinders or pumps, preferably radially disposed on the disk 4, as there are pinions 5, whereby each pinion operates a single piston. Each pump or cylinder may be mounted on or cast integral with the disk or plate 4. The inner end of each cylinder is open and is preferably arranged so that its edge lies in a plane parallel to the axis of the shafts 1 and 2, and forms with the inner edges of the other cylinders a passageway or slideway 8, square in cross section.

9 indicates means for regulating the escape of fluid from the inner ends of the cylinders, thereby controlling the compression in the latter. This controlling means preferably consists of a sleeve $9^a$ surrounding the shaft 2, slidable longitudinally thereon, and fitted snugly in the passageway 8. This sleeve is provided on the outside with a number of flat surfaces $9^b$, one for each pump or cylinder 7, and is adapted to open and close the inner ends of the cylinders and thus control the compression of fluid therein. In the use of the term fluid throughout the specification and claims, I desire to be understood as including within the meaning of such term, air, vapors or liquids. By reference to the drawings, it will be seen that by sliding the sleeve $9^a$ toward and from the disk 4, the flat surfaces or valve portions $9^b$ operate to close all of the inner ends of the various cylinders simultaneously.

10 represents a collar carried by the controlling means 9 and adapted to receive a yoke or other device for effecting the sliding of the sleeve $9^a$ to and fro. Each cylinder is provided with suitable inlet ports for the air or other fluid. These, for illustration, I have shown at 11 on each cylinder, intermediate of its ends, preferably a number of such inlet ports being disposed about the periphery of each cylinder in a common plane, and arranged to be cleared by the piston in said cylinder on its outward stroke, so as to allow the free intake of air to the inner end of the cylinder.

When the shafts 1 and 2 are free to rotate relatively to each other and the former is rotating, the gear 3 rotates the pinions 5 thereby causing the reciprocation of the pistons $7^b$ back and forth in their respective cylinders $7^a$. As the outer ends of the cylinders are open to the atmosphere, no compression takes place in a cylinder as its piston moves outwardly therein. When it is desired to transmit power from the driving shaft 1 to the driven shaft 2, the controlling valve 9 is moved to close the inner ends of the pumps or cylinders; and by the movement of the pistons 7$^b$ toward the inner ends of their respective cylinders 7$^a$, the fluid therein is compressed. The gear 3 tends to rotate the pinions 5 about their respective axes, and the resistance of the fluid in the cylinders to compression by the pistons, tends to oppose through the connecting rods and cranks, the rotation of the pinions 5 about their respective axes. When this resistance to rotation of said pinions incident to the compression aforesaid equals or exceeds the effort of said gear 3 to revolve the pinions about their respective axes, then the gear 3 and disk 4 will rotate at the same speed. When, however, the resistance which the compression devices offer to the rotation of the pinions 5 about their respective axes is less than the turning effort of the gear 3 on said pinions, the pinions will turn on their respective axes and will also ride around the gear 3, causing the disk 4 to be rotated, but at less speed than the speed of rotation of the driving shaft. Since, when the device is thrown into operation, the movements of the pistons 7$^b$ compress the fluid in the cylinders gradually from normal pressure to a pressure sufficiently great to stop the rotation of the pinions, the forces acting upon the latter are retarding in their nature and effect a clutching of the two shafts 1, 2, without undue torsional strains thereon.

It is expedient to be able to positively lock the shafts 1, 2, in operative relation by means separate or auxiliary to the fluid mechanism. For this purpose I preferably provide a pin 12 adapted to interlock or connect the disk 4 to the gear 3. This pin is threaded and screwed at one end into an arm 12$^a$ preferably carried by the controlling valve 9. The pin extends through an aperture 12$^b$ that is formed in the disk 4, so that its free end may project through said aperture and engage with the gear 3 and lock the latter to the said disk by a sliding movement of the valve 9.

13 indicates a recess formed in the gear 3 to receive the free end of the pin, and 14 indicates a guide slot leading to and having its bottom surface inclined toward the recess 13. The free end of the pin 12 is also preferably given an inclination corresponding to the bottom surface of the slot 14.

In the preferred form of the invention I provide a series of pins 12 arranged at equal distances apart around the axis of the shaft 2, and preferably arranged so that each lies between adjacent sides of adjoining pumps, and also provide an equal number of apertures 12 in the disk 4, and recesses 13 and slots 14 correspondingly arranged in the gear 3. By this construction the forces operating to turn the shafts when locked directly together are equalized upon opposite sides of the axes of the said shafts.

The pins 12 are carried by and move simultaneously with the valve 9, but they are of such length that they do not normally extend to or come into interlocking engagement with the gear 3 when the valve is moved so as just to close the inner ends of the pump or compression cylinders. To cause the pins 12 to engage with the gear 3, the valve 9 is given an additional sliding movement beyond the point where the inner ends of the cylinders are closed by it; the purpose being that this operation of locking the two shafts in operative relation shall not take place until after they have been clutched together and power transmitted from one to the other through the fluid mechanism, and the driven shaft has been brought up to substantially the same speed of rotation as the driving shaft. To permit the sliding movement of the valve 9 for throwing the positive locking means into operation, the disk 4 is preferably recessed at 15 to receive the inner end of the sleeve, while the latter is cut away at its corners, as shown at 16, so that the fluid in the recess 15 may escape and also to increase the space in the device into which fluid is exhausted from the cylinders and from which it may be drawn into the cylinders on the suction strokes.

By sliding the sleeve 9 slowly toward the disk 4, to close the inner ends of the cylinders, the compression of the fluid therein may be so controlled that the rate of the retarding force operating to stop the rotation of the pinions about their respective axes will be very slow, thus throwing the clutch mechanism into operation gradually and effecting a turning of the driven shaft at a slow rate of speed, and without jar or sudden strains thereon. By sliding the sleeve slowly in the opposite direction the two shafts may be unclutched in a similar manner, or it may be moved rapidly, unclutching the two shafts immediately.

In the drawings, I have preferably shown the pistons in different relative positions within their respective positions; that is, one is down and the other is up, while the remaining two are in mid position, one ascending or moving outwardly relative to the shaft and the other descending or moving inwardly. In this arrangement, it will be seen that whenever the valve 9 is operated, one of the pistons is always in position ready to compress the fluid in its cylinder as soon as the inner end thereof is closed, so that the driving shaft and gear are immediately thrown into clutch relation to each other. If desired, however, the pistons may be arranged so that two are ascending at the same time the remaining two are descending, or they may all be arranged to move in the same direction simultaneously.

To those skilled in the art of constructing a mechanism of the class described, many alterations in structure and widely differing embodiments and applications of my invention will suggest themselves, without departing from the spirit and scope thereof. My disclosures and description herein are purely illustrative, and are not intended to be in any sense limiting.

What I claim is:

1. In a transmission mechanism, the combination with a driving shaft and a driven shaft, of a gear mechanism for connecting the two shafts comprising a gear carried by one of the said shafts and a plurality of pinions carried by the other shaft and each meshing with said gear, the said pinions being uniformly spaced from each other around the axes of said shafts, a fluid compression system for controlling the relative movement of said pinions and gears including a series of compression cylinders, and pistons each operated by one of said pinions, each of said cylinders being entirely open at its compression end for the escape of fluid and said open end operating as a valve seat, and a valve mechanism for closing said open ends.

2. In a transmission mechanism, the combination with a driving shaft and a driven shaft, of a gear mechanism for connecting the two shafts comprising a gear carried by one of the said shafts and a plurality of pinions carried by the other shaft and each meshing with said gear, the said pinions being uniformly spaced from each other around the axes of said shafts, a fluid compression system for controlling the relative movement of said pinions and gears including a series of compression cylinders, and pistons each operated by one of said pinions, said cylinders being arranged radially of the shafts and their compression ends being entirely open, and a valve for closing said open ends simultaneously.

3. In transmission mechanism, the combination with a driving shaft and a driven shaft, of planetary gear mechanism connecting the two shafts, a fluid compression system for controlling the relative movement of the planetary gears including a compression cylinder having an inlet opening for the fluid, the compression end of the said cylinder being entirely open and the circumferential edge or wall at the said end forming a valve seat, and a single valve for controlling the said open end.

4. In transmission mechanism, the combination with two shafts, of a member carried by each shaft, fluid operated means for connecting the two members together, and auxiliary means for positively connecting the said two members together.

5. The combination of two shafts, one of which is driven, a member carried by each shaft, means including a plurality of compression cylinders for connecting the two members together, and means interposed between the cylinders for positively locking the two members in operative relation.

6. The combination of two shafts one of which is adapted to be driven by the other, fluid operated means for connecting the two shafts together, the said means comprising a plurality of compression cylinders, means for controlling the fluid operated means, and means interposed between the compression cylinders for positively locking the shafts in operative relation.

7. In transmission mechanism, the combination with a driving shaft and a driven shaft, of a gear carried by one of the said shafts, a disk carried by the other shaft, a freely rotatable pinion mounted on the disk and meshing with the said gear, means for preventing the rotation of the pinion to connect the disk and gear together, and separate means for locking the said disk and gear together, the said separate means being connected with and actuated by the pinion control means, whereby the separate means connect the disk and gear after the pinion control means has been operated to prevent rotation of the pinion and disconnect the disk and gear prior to the operation of said means when operated to release the pinion.

8. In transmission mechanism, the combination with a driving shaft and a driven shaft, of a gear carried by one of the said shafts, a disk carried by the other shaft, a freely rotatable pinion mounted on the disk and meshing with the said gear, means for preventing the rotation of the pinion to connect the disk and gear together, and interlocking means between the disk and gear for positively locking them together, the said interlocking means being actuated by the pinion control means.

9. In transmission mechanism, the combination with a driving shaft and a driven shaft, a gear carried by one of the said shafts, a disk carried by the other shaft, a compression cylinder, provided with a piston, carried by the said disk, the compression end of the cylinder being open, a pinion meshing with the said gear and connected with the piston, and a valve slidably mounted on one of the shafts for closing the open end of the said cylinder for and controlling the compression of a fluid therein.

10. In transmission mechanism, the combination with a driving shaft and a driven shaft, of a gear carried by one of the said shafts and a disk carried by the other, a pinion carried by said disk and arranged to mesh with the said gear, a compression pump or cylinder carried by the disk for preventing the rotation of the pinion whereby the gear and disk are connected together, means for controlling the operation of the pump or cylinder, and means extending through the disk and arranged to engage with the gear for positively locking the said disk and gear together.

11. In transmission mechanism, the combination with a driving shaft and a driven shaft, of a gear carried by one of the said shafts and a disk, carried by the other, a pinion carried by said disk and arranged to mesh with the said gear, a compression pump or cylinder carried by the disk for preventing the rotation of the pinion whereby the gear and disk are connected together, means for controlling the operation of the pump or cylinder, and a rod operated by the movement of the said controlling means and extending through the disk and engaging said gear for positively locking the disk and gear together.

12. In transmission mechanism, the combination with a driving shaft and a driven shaft, of a gear carried by one of the said shafts and provided with a recess, a disk carried by the other shaft, fluid operated means for connecting the disk and gear together, and a pin extending through the disk and arranged to enter the recess in the gear for locking the said gear and disk together.

13. In transmission mechanism, the combination with a driving shaft and a driven shaft, of a gear provided with a recess carried by one of the shafts, a disk provided with an aperture carried by the other shaft, fluid operated means for connecting the gear and disk together, means for controlling the operation of the fluid operated means, and a pin extending through the aperture in the disk and arranged to enter the recess in the gear for locking the disk to the gear.

14. In transmission mechanism, the combination with a driving shaft and a driven shaft, of means for connecting the two shafts together, including a cylinder having an open end, and a valve slidable on one of the shafts for closing the open end of the said cylinder to control the compression therein.

15. In transmission mechanism, the combination with a driving shaft and a driven shaft, of means for connecting the two shafts together, including a cylinder having an open end, and a valve slidable on one of the shafts for closing the open end of the said cylinder to control the compression therein, and means for positively locking the said shafts together in clutched relation.

16. In transmission mechanism, the combination with a driving shaft and a driven shaft, of means for connecting the two shafts together, including a cylinder having an open end, and a valve slidable on one of the shafts for closing the open end of the said cylinder to control the compression therein, and means operated by the said valve for positively locking the said shafts in clutched relation.

17. In transmission mechanism, the combination of a driving shaft, a driven shaft, a disk carried by one of said shafts and a pinion carried thereby, a gear carried by the other shaft and meshing with said pinion, fluid compression means for controlling the rotation of said pinion whereby the disk and gear may be connected and disconnected to and from each other, separate means for locking the disk and gear together, and a slidable device operating first to control the fluid compression means and then to operate the said disk and gear locking means.

18. In transmission mechanism, the combination of a driving shaft and a driven shaft, fluid operated means including a plurality of radially disposed compression cylinders for connecting the said shafts together, each of said cylinders having its compression end open; and a valve member having a plurality of cylinder closing surfaces each adapted to close the open end of an adjacent cylinder.

19. In transmission mechanism, the combination of a driving shaft and a driven shaft, fluid operated means including a plurality of radially disposed compression cylinders for connecting the said shafts together, each of said cylinders having its inner compression end open, and a sliding valve member having a plurality of cylinder closing surfaces, each adapted to close the open end of an adjacent cylinder.

20. In transmission mechanism, the combination of a driving shaft and a driven shaft, fluid operated means including a plurality of radially disposed compression cylinders for connecting the said shafts together, each of said cylinders having its inner compression end open, and a valve member slidably mounted on one of said shafts and having a plurality of cylinder closing surfaces each adapted to close the open end of an adjacent cylinder.

21. In transmission mechanism, the combination of two shafts, one of which is driven, two members, one carried by each of said shafts, and mechanism for connecting the said members together including a cylinder open at its compression end, a fluid displacing member in said cylinder and movable therein in one direction to a point substantially in the plane of the open end of the cylinder, and a valve for closing the open end of the cylinder.

22. In transmission mechanism, the combination of two shafts, one of which is driven, means for connecting the two shafts together, the said means including a plurality of open ended cylinders and a fluid displacing member movably mounted in each cylinder, and mechanism for controlling the compression in said cylinders, the said mechanism comprising a member slidable on one of said shafts and a sliding valve for closing the open end of each cylinder, the said valves being connected with and operated simultaneously by said slidable member.

In testimony whereof I affix my signature, in the presence of two witnesses.

GEORGE JACOBS.

Witnesses:
W. H. SMITH,
EDWARD R. ALEXANDER.